(12) United States Patent
Muster et al.

(10) Patent No.: US 7,748,341 B2
(45) Date of Patent: Jul. 6, 2010

(54) LENS COATING APPARATUS

(75) Inventors: Kenneth F. Muster, Yorba Linda, CA (US); William M. Palleva, Cerritos, CA (US); Terry Van Blaricom, Sherman Oaks, CA (US); Patrick M. Green, Long Beach, CA (US)

(73) Assignee: Satisloh North America, Inc., Germantown, WI (US)

( * ) Notice: Subject to any disclaimer, the term of this patent is extended or adjusted under 35 U.S.C. 154(b) by 1000 days.

(21) Appl. No.: 11/502,306

(22) Filed: Aug. 10, 2006

(65) Prior Publication Data

US 2008/0035053 A1    Feb. 14, 2008

(51) Int. Cl.
*B05C 5/02* (2006.01)
*B05C 3/09* (2006.01)

(52) U.S. Cl. .............. 118/52; 118/56; 118/66; 118/319; 118/320; 118/407; 118/426; 118/503

(58) Field of Classification Search ............ 118/52, 118/56, 319, 320, 407, 426, 66, 500, 503; 427/162, 164, 165, 169, 430.1; 134/901
See application file for complete search history.

(56) References Cited

U.S. PATENT DOCUMENTS 3,765,591 A * 10/1973 Cook ..................... 228/36
5,271,953 A * 12/1993 Litteral ..................... 427/8
6,129,042 A    10/2000 Smith et al.
6,296,707 B1  10/2001 Adamczyk et al.
2003/0051744 A1* 3/2003 Sullivan .................. 134/57 R

FOREIGN PATENT DOCUMENTS

JP         2001212494       *   8/2001

* cited by examiner

*Primary Examiner*—Laura Edwards
(74) *Attorney, Agent, or Firm*—Stetina Brunda Garred & Brucker

(57) ABSTRACT

An apparatus for coating the surface of a lens includes a carousel having a central hub and a plurality of arms. A drive shaft is mounted to each arm, with a magnetic clutch and a lens holder being operatively attached to the drive shaft. The carousel is configured to be raised, rotated, and lowered into a series of workstations for processing the lens in a predetermined sequence. A workstation has associated therewith a spin drive attached to a reciprocating arm assembly. The spin drive includes a magnetic clutch which may be coupled to the magnetic clutch of any one of the arms on the carousel, such that a rotation generated by the spin drive is transferred to the drive shaft, and the lens holder. The arm assembly is capable of being extended and retracted to selectively engage and disengage the carousel.

19 Claims, 9 Drawing Sheets

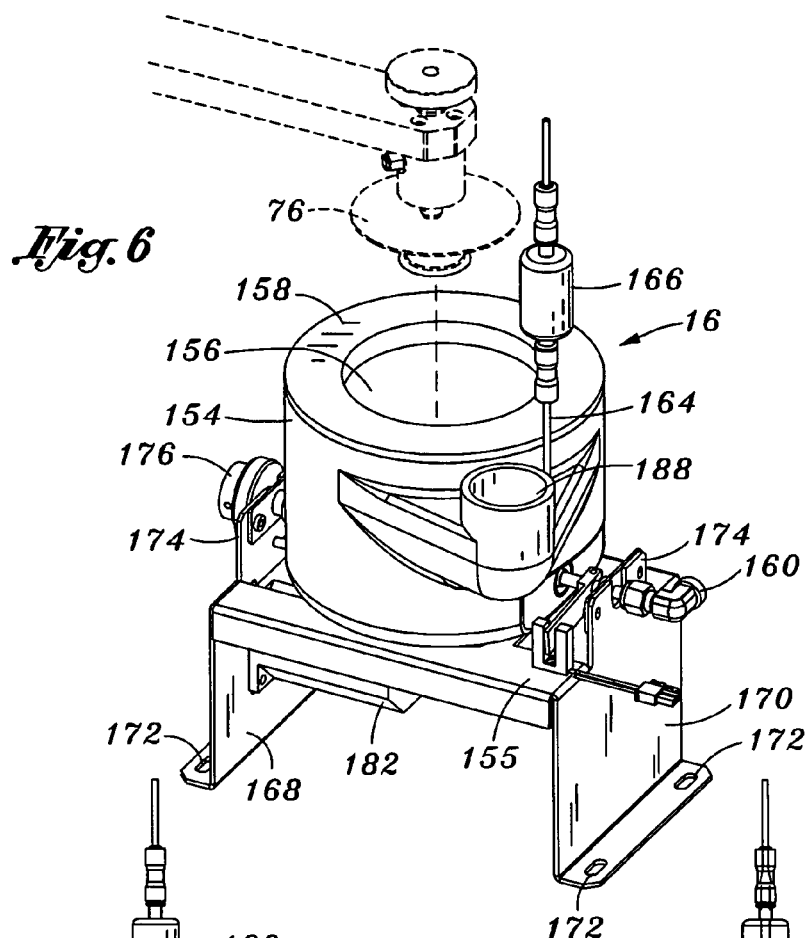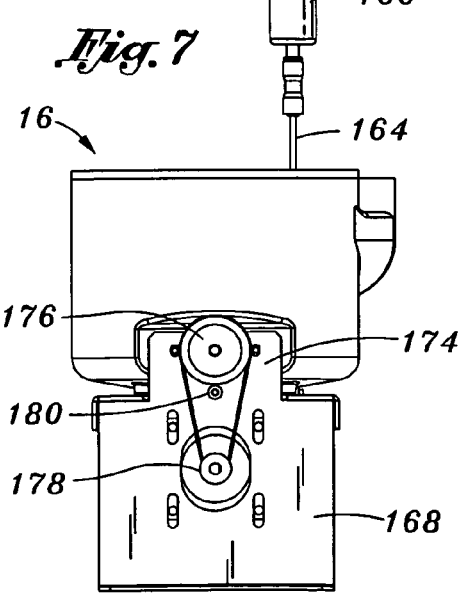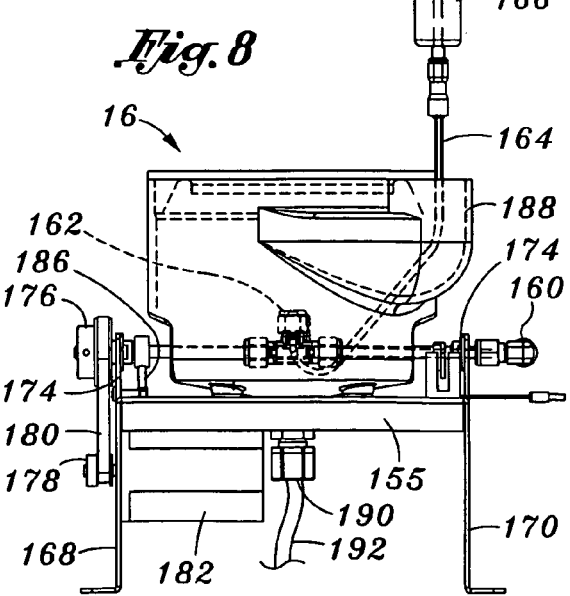

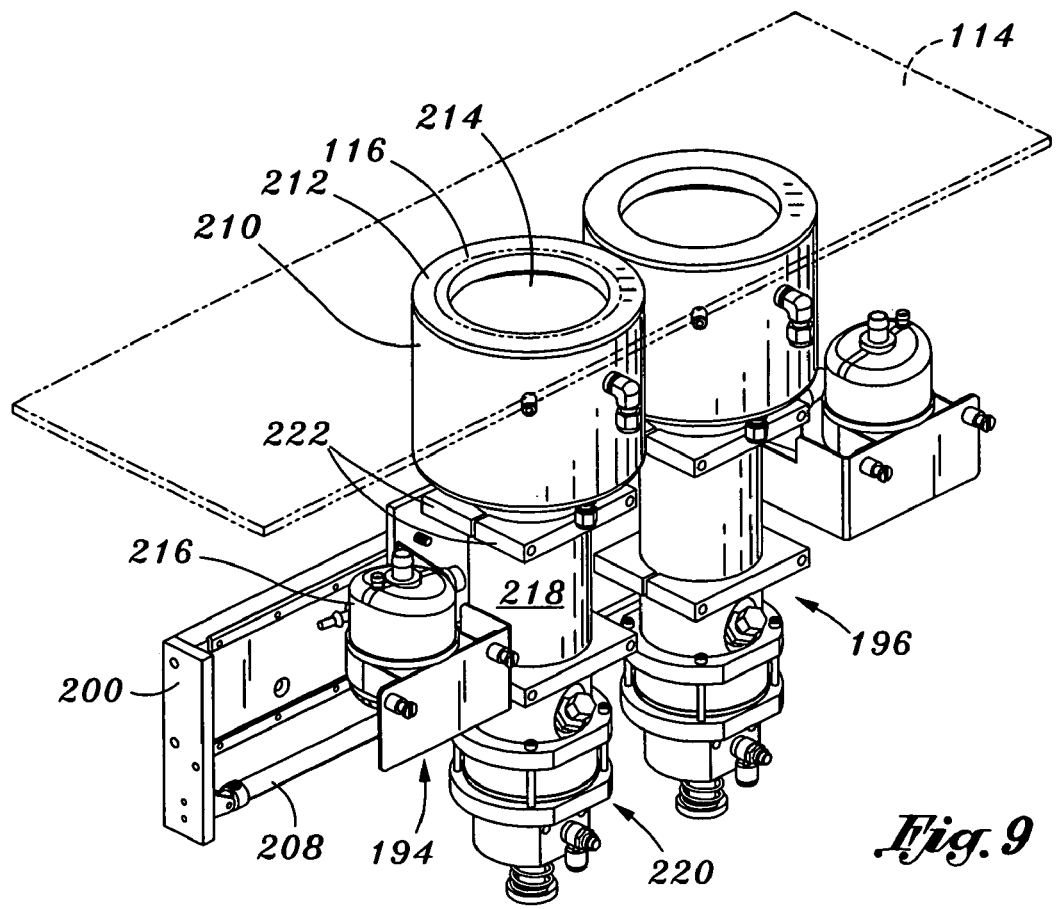
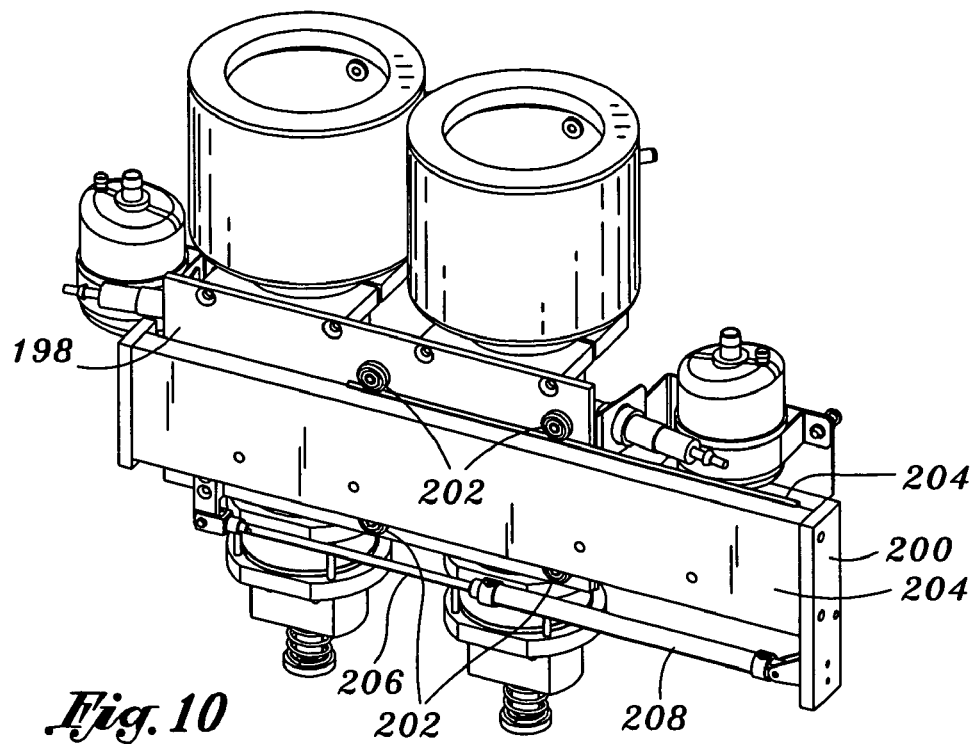

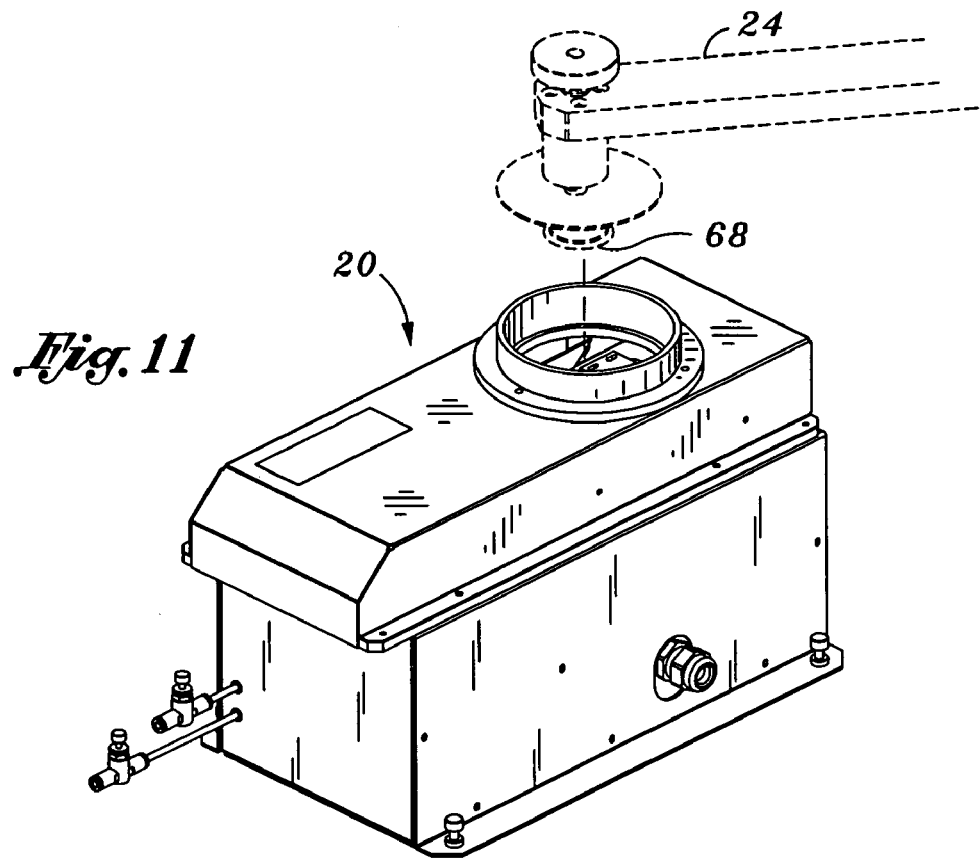
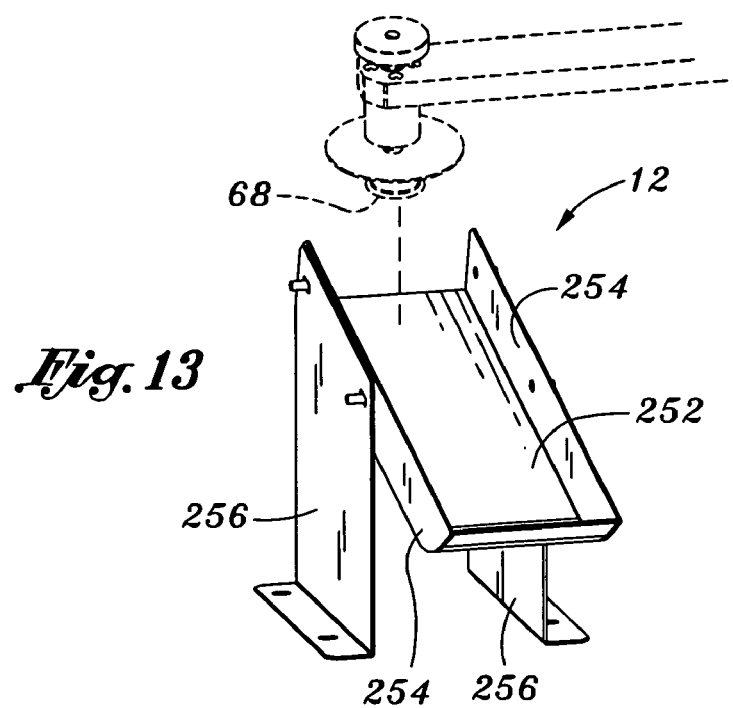

LENS COATING APPARATUS

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

1. Technical Field

The present invention generally relates to devices for manufacturing lenses. More particularly, the present invention relates to automated machines for applying coatings to lens surfaces.

2. Related Art

Conventional lenses such as those utilized in eyeglasses are often fabricated from materials such as plastic, polycarbonate, and Trivex®, and less commonly from glass. As will be appreciated, a wide variety of materials are being utilized for a wide range of needs, each material having respective advantages and disadvantages. One common characteristic desired in all lenses is the ability to resist scratches and other light impact, and is most often achieved by the well recognized methods of applying hard coatings on the lens. Scratch resistance is not the only generally desirable lens characteristic, however, and other common features include Ultraviolet (UV) ray blocking properties, anti-reflective properties, and mirrored finishes. Many of these features are imparted on lenses by way of coatings applied thereon.

Prior to the development of automated machines, the coating was applied manually, wherein the lens was dipped into a coating resin and subsequently cured in an oven. In further detail, the lens was inserted into a washing chamber to be washed by hand or by the use of a high pressure wash pump. The lens was dried by holding the lens over a filtered compressed air jet, and then the dried lens was manually moved to a coating apparatus. After dipping the lens in the coating apparatus, the coated lens was manually transferred to a curing oven, and the coating was cured. There were substantial deficiencies with this method, namely, the inherent likelihood of human error potentially resulting in the lens surface being unevenly coated, causing optical distortion. In addition to distortion, improperly applied coatings can also result in reduced scratch resistance on the lens surface. The process was expensive and time consuming since the curing process required several hours. Most often the coating material was not recycled, resulting in wasted coating material and a greater volume of hazardous waste requiring disposal. Additionally, substantial environmental controls were necessary to prevent the introduction of dust and other particles that could attach to the surface of the coating, and to prevent the lingering and possible escape of the hazardous coating materials.

Recognizing these deficiencies, those in the art developed a wide variety of machinery to automate the process. Earlier machines were often large and cumbersome, as well as expensive, often precluding eyeglass retailers from procuring such machinery. Retailers were thus required to send the lenses to larger manufacturing facilities, resulting in greater costs and longer lead times for customers. Conventional lens coating machinery generally divided the process into the washing/drying stage, coating stage, and the curing stage. In the typical washing/drying stage, the lens was placed in a basin and sprayed with a jet of de-ionized water, and dried by evacuating the basin. In order to enhance drying, the lens was spun to remove the water by centrifugal force. In the coating stage, a process known in the art as spin coating was utilized. First, the coating material, typically a volatile solvent, is deposited on the surface of the lens in excess of the actual volume required. The lens is then rotated at great speeds, spreading the coating material evenly across the surface of the lens and forcing the excess off the edge of the lens. As the lens is rotated at a constant speed, evaporation of the solvent is facilitated. After a thin film of the coating material is deposited, the lens is dried and the coating thereon is cured in an ultraviolet oven, resulting in a completed lens.

While the basic process of cleaning, drying, coating, and curing remained the same in the lens coating machines, a number of improvements were made which were intended to overcome the above described limitations of size and cost. Nevertheless, deficiencies persisted in areas such as process throughput, energy efficiency, and device lifespan. Thus, a lens coating apparatus which can overcome these limitations is needed in the art.

BRIEF SUMMARY OF THE INVENTION

In light of the foregoing limitations, the present invention was conceived. In accordance with the present invention, an apparatus for coating a surface of a lens is provided. The apparatus may include a frame, as well as a plurality of workstations disposed on the periphery of the frame. The workstations may each perform an operation on the lens. Additionally, a centrally disposed rotatable carousel may be included, in which the carousel may have a hub and a plurality of arms. This carousel may be configured to reciprocate along the vertical axis thereof. The arms may each define a proximal end that may be contiguous with the hub, and an opposed distal end. The distal end may include a drive shaft mounted thereon, with a lens holder attached to the drive shaft. A first magnetic clutch may be attached to the drive shaft. The apparatus may also include a spin drive assembly having a spin drive attached to an arm assembly. The spin drive may be a brushless DC motor. Furthermore, the spin drive may be operatively connected to a second magnetic clutch. Thus, the first magnetic clutch can be coupled to the second magnetic clutch, with the rotational motion generated by the spin drive transferred to the drive shaft and accordingly, the lens holder.

Further in accordance with the present invention, one of the workstations may define an access port for inserting the lens as well as the lens holder within such workstation. Additionally, there may be an annular splash guard attached to the distal end of the arm so that it is coaxial with the drive shaft. It is understood that the splash guard may be configured to cover the access port.

Each lens holder of the present apparatus may include a suction cup that may itself include a vacuum conduit which is capable of retaining the lens by suction imparted through the vacuum conduit. Moreover, there may be a spindle that has a static section and a dynamic section. The static section may be mounted to the frame, while the dynamic section may be fixed to the hub of the carousel. More particularly, the dynamic section may include a first connector in fluid communication with a second connector in the static section. The first connector may be linked to a third connector on the carousel, while the second connector may be linked to a vacuum generator.

The arm assembly of the present apparatus may have a retracted position and an extended position. The arm assembly may be in the extended position when the first magnetic clutch is coupled to the second magnetic clutch. Further, the arm assembly may be in the retracted position when there is sufficient clearance between the spin drive and the arm of the carousel for the carousel to be lifted without obstruction.

The arm assembly may also include a central piston that reciprocates within a cylinder arm disposed in an arm compartment. The central piston may either be pneumatically or hydraulically actuated. Additionally, there may be an arm reciprocating within the arm compartment.

One workstation of the present apparatus may be a loading station that may include a lens lift to convey the lens to the lens holder. Additionally, one workstation may be a wash station for cleaning the surface of the lens, with another workstation being a coating station for applying a layer of a fluid coating to the lens. Another workstation may be a curing station for curing with an electromagnetic emission a coating deposited on the lens. Finally, another workstation may be an unloading station for removing the lens from the apparatus.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 6 is a perspective view of a washing station of the lens coating apparatus of the present invention;

FIG. 7 is a side elevational view of the washing station showing a belt system for turning a water jet nozzle;

FIG. 8 is a front elevational view of the washing station illustrating an interior of the wash basin with the water jet nozzle and a cleaning fluid nozzle;

FIG. 9 is a top, front perspective view of a coating station of the lens coating apparatus of the present invention;

FIG. 10 is a top, rear perspective view of the coating station with a selective coating basin mechanism;

FIG. 11 is a top perspective view of a curing station of the lens coating apparatus of the present invention;

FIG. 13 is a perspective view of an unloading station of the lens coating apparatus of the present invention.

DETAILED DESCRIPTION OF THE INVENTION

The detailed description set forth below in connection with the appended drawings is intended as a description of the presently preferred embodiment of the invention, and is not intended to represent the only form in which the present invention may be constructed or utilized. The description sets forth the functions and the sequence of steps for developing and operating the invention in connection with the illustrated embodiment. It is to be understood, however, that the same or equivalent functions and sequences may be accomplished by different embodiments that are also intended to be encompassed within the spirit and scope of the invention. It is further understood that the use of relational terms such as first and second, top and bottom, and the like are used solely to distinguish one from another entity without necessarily requiring or implying any actual such relationship or order between such entities.

Figure 1:
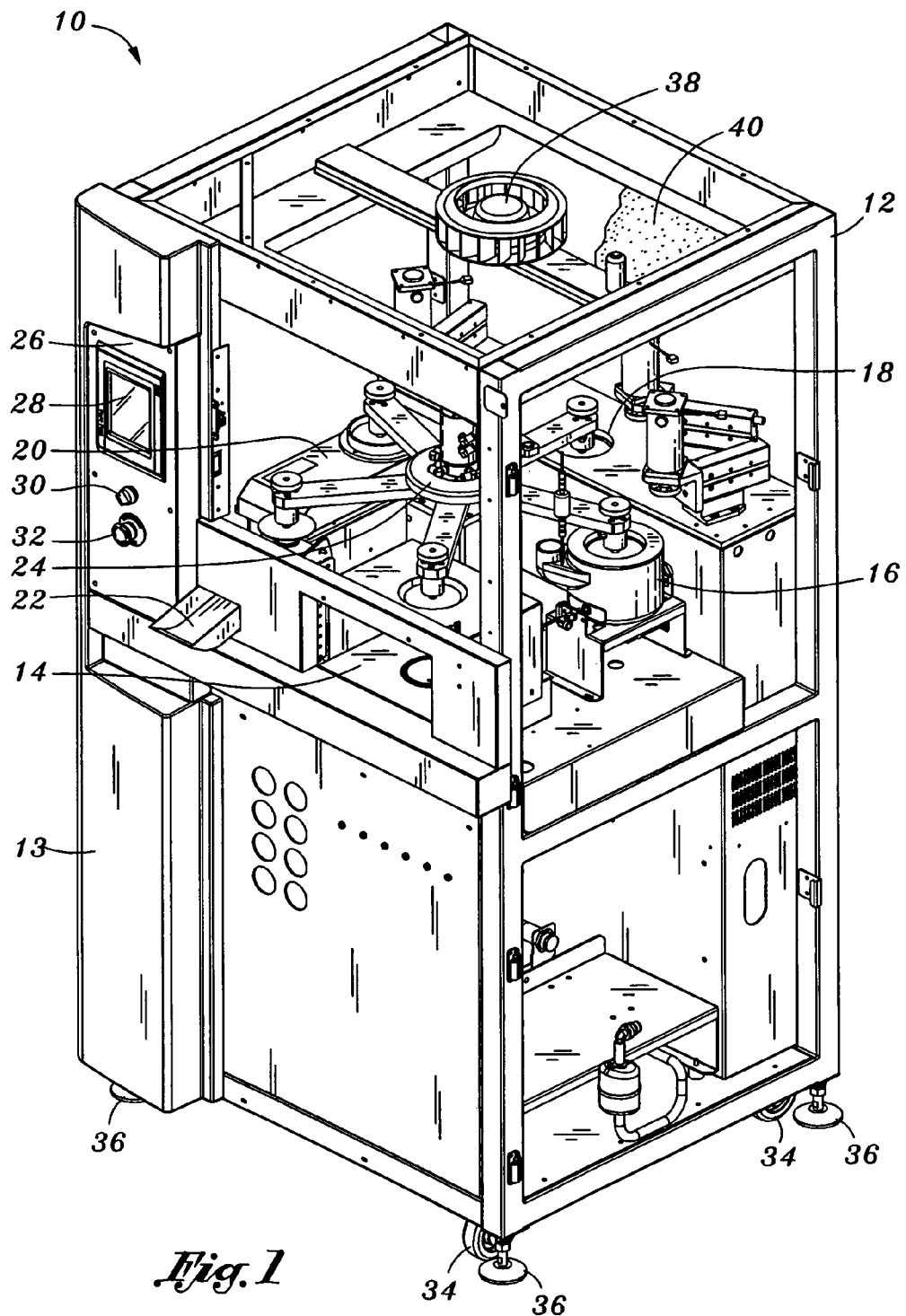
FIG. 1 is a perspective view of a lens coating apparatus of the present invention showing the interior thereof.

Referring now to FIG. 1, a spin coating apparatus 10 constructed in accordance with the present invention is illustrated. The spin coating apparatus 10 includes a frame 12 which supports and encloses the various components associated with the spin coating apparatus 10. By way of example only and not of limitation, the frame 12 is generally defined by a series of beams or struts arranged in a quadrangular or box-like configuration, each side of which may be fitted with an enclosing panel (not shown) for preventing contaminants from entering the interior thereof. As a partial, exemplary illustration of this feature, the spin coating apparatus 10 is shown with a front panel 13 covering the front of the frame 12.

Figure 2:
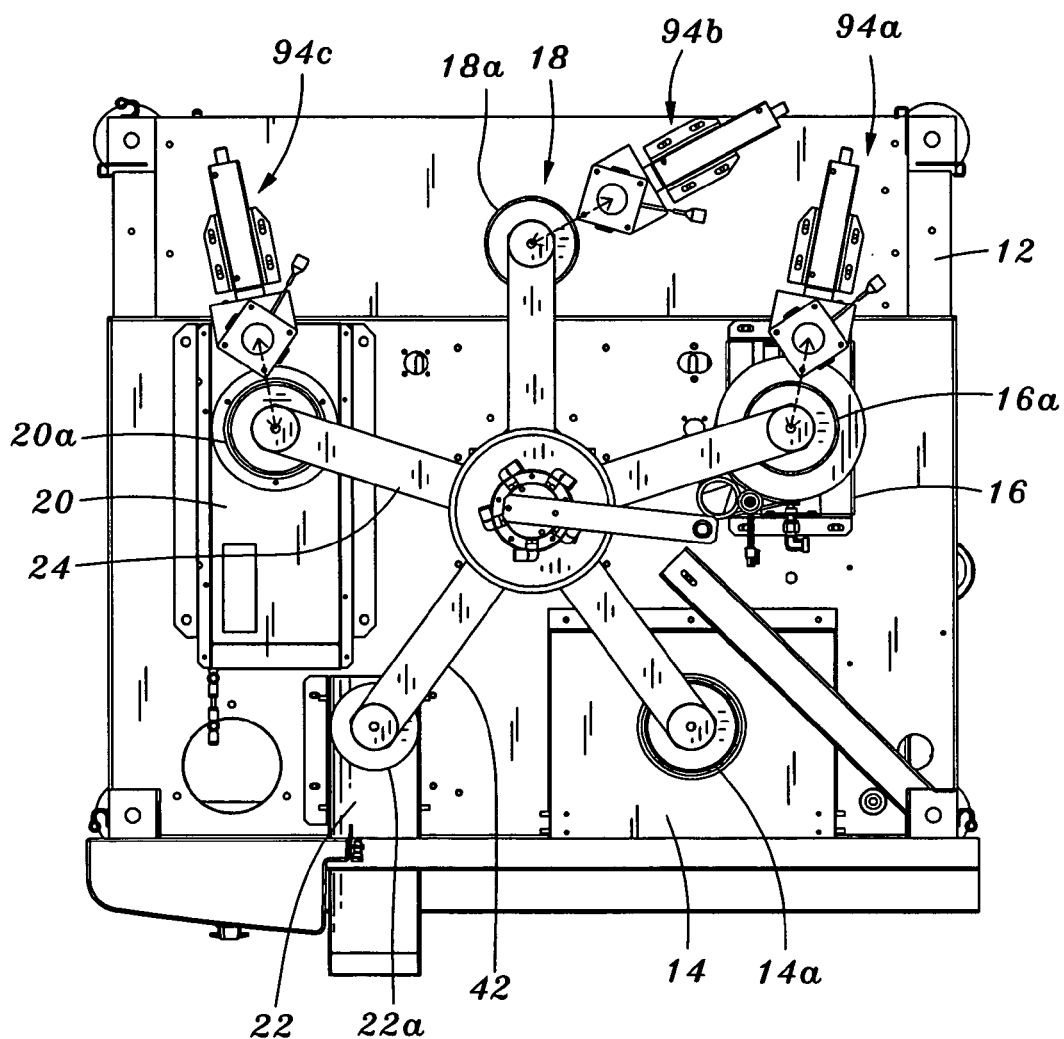
FIG. 2 is a top plan view of the lens coating apparatus illustrating a rotating carousel having a set of arms which are positioned above respective ones of the workstations of the lens coating apparatus of the present invention.

Referring concurrently to FIG. 2, the coating apparatus 10 includes a number of work stations within the confines of the frame 12 for performing one or more operations on a lens. Initially, the lens is loaded into the coating apparatus 10 through a loading station 14. Thereafter, the lens is washed and dried in a washing station 16, and then a lens coating is applied in a coating station 18. The coating deposited on the lens is then dried and cured in a curing station 20. The completed lens is then transferred out of the lens coating apparatus 10 by being dropped off in an unloading station 22. In this regard, the transportation of the lens from station to station is achieved with a carousel 24 which holds the lens and rotates the same between the various workstations 14, 16, 18, 20 and 22 as will be described in more detail below.

The operation of the carousel 24 and the individual workstations 14, 16, 18, 20 and 22 are controlled by a central microprocessor embedded within the control panel 26. Such a microprocessor may be programmed with instructions operative to transmit electrical signals that activate the various motors, solenoids, pneumatics, and like devices in a predetermined sequence. In almost all cases, because the load requires considerably more power than what the microprocessor can supply, the microprocessor is electrically isolated via the use of relays. As will be recognized by one of ordinary skill, any of the numerous techniques well known in the art to provide such central control may be utilized without departing from the scope of the present invention. In order to provide status information regarding the operation of the lens coating apparatus 10, there is provided a control screen 28 that is attached to the control panel 26. Data may be processed by the aforementioned microprocessor, and transmitted for display on the control screen 28. Additionally, the control screen 28 may be touch sensitive or otherwise responsive to an input thereon, and transmit signals representative of such input back to the microprocessor. Prior to the initiation of the processing sequence, the control screen 28 having input capabilities may be utilized to fine-tune the operation of the lens coating apparatus 10. Other inputs on the control panel 26 include an on/off switch 30 and an emergency shutoff switch 32.

Turning now to the bottom end of the frame 12, cooperatively engaged thereto are casters 34 and wheels 36. The casters 34 improve mobility of the lens coating apparatus 10, facilitating transportation and installation. The feet 36 stabilize the lens coating apparatus 10 when stationary. It is understood that projection height of the feet 36 are each individually adjustable with a variety of mechanisms well known in the art, such that the lens coating apparatus 10 may be properly leveled during installation. As will be appreciated by one of ordinary skill, to ensure an even distribution of the coating on the lens, the lens coating apparatus 10 should be completely level. Even a slight deviation could result in substantial defects.

As discussed above, it is necessary to maintain a clean environment within the interior of the lens coating apparatus 10. Specifically, particulates introduced to the interior could result in the contamination of the coated lens. Further, allowing the gaseous forms of the volatile coating fluids to remain in the interior could increase the likelihood of catastrophic failure such as fires, explosions, and the like. To this end, a centrifugal fan 38 is provided on the upper end of the frame 12, and cleans the air through a filter 40, preferably of the HEPA type. Thus, particulate-free air is circulated within the interior of the lens coating apparatus 10.

Figure 3:
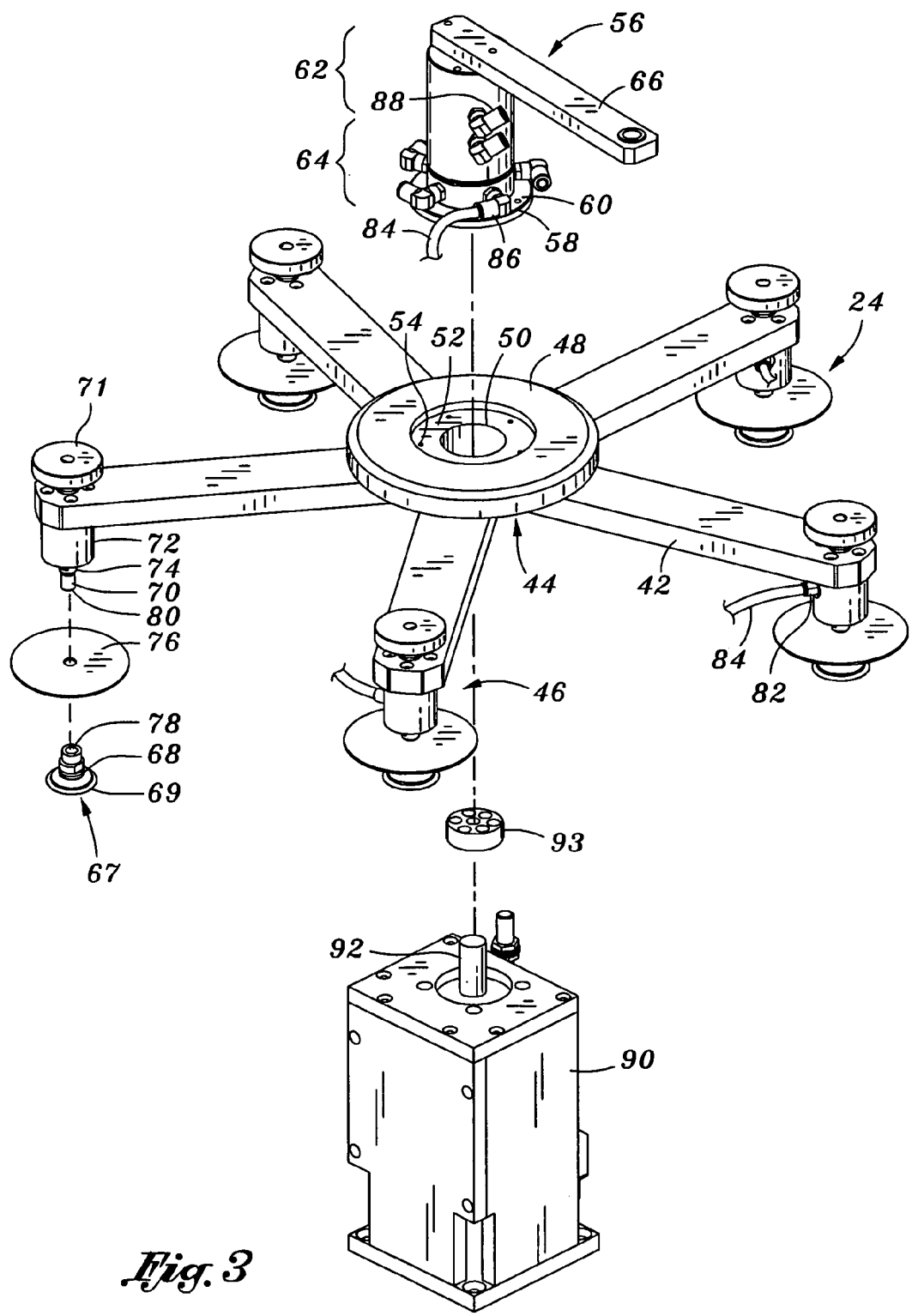
FIG. 3 is an exploded perspective view of the carousel, a spindle, and a motor assembly of the lens coating apparatus of the present invention.

With reference to FIG. 3, further details relating to the carousel 24 and its related components will now be described. As explained above, the carousel 24 is the mechanism by which the lens is conveyed from workstation to workstation. The carousel 24 includes multiple arms 42, each having a proximal end 44 and a distal end 46. The proximal end 44 of each arm 42 is contiguous with an annular hub 48, the inner periphery of which defines a receiving hole 50 and a spindle recess 52. The portion of the hub 48 that defines the spindle recess 52 also defines fastener holes 54.

Fitted within the spindle recess 52 of the hub 48 and attached thereto is a spindle 56. More particularly, the spindle 56 includes a flange 58 having fastener holes 60 which are configured to be coaxially aligned with respective ones of the fastener holes 54 within the spindle recess 52. It is understood that any suitable fastening member, such as a bolt or a screw, may be threaded or otherwise inserted through each set of the coaxially aligned fastener holes 54, 60 to attach the spindle 56 to the hub 48. The spindle 56 includes a rotationally static section 62 and a rotationally dynamic section 64, in which the dynamic section 64 can rotate coaxially relative to the static section 62. Since the dynamic section 64 of the spindle 56 is fixed to the hub 48, as the hub 48 rotates, so does the dynamic section 64. Meanwhile, the static section 62 is prevented from rotating by a frame attachment member 66 which is movably mounted to the frame 12 so as to be capable of reciprocal vertical movement relative thereto.

As to the functionality of the carousel 24 to convey the lens between workstations, the distal end 46 of each arm 42 that comprises a portion of the carousel 24 includes a lens holder 67 having a suction cup 68 operative to hold the lens. The lens coating apparatus 10 of the present invention is configured to coat the concave (under) side of the lens, the suction cup 68 thus having a concave shape that generally corresponds to the opposite, convex side of the lens. However, those of ordinary skill in the art will recognize that the suction cup 68 may be configured to grip the concave side of the lens in the event that the coating of the convex side of the lens is desired. Each lens holder 67 is attached to a corresponding drive shaft 70, which is rotatably mounted within a stator 72. The drive shaft 70 extends generally perpendicularly relative to the lengthwise axis of the corresponding arm 42, and protrudes from the lower end of the stator 72 as well as the upper side of the arm 42. A non-rotating section 74 on the stator 72 retains an annular splash guard 76. Attached to the upper end of the drive shaft 70 centered on the axis thereof is a disk shaped first magnetic clutch 71.

As will be appreciated by one of ordinary skill, each suction cup 68 may be constructed of rubber or other like substance that allows the same to non-abrasively grip the surface of the lens. As will be further appreciated, however, the adhesion force provided by the suction cup 68 is typically not sufficient to retain the lens during high-speed rotation during the washing and coating thereof. Accordingly, each suction cup 68 defines a vacuum conduit 78 that extends from the lens gripping surface 69 through the corresponding lens holder 67. Each drive shaft 70 also includes a vacuum conduit 80, which is in fluid communication with a connector 82. In turn, the third connector 82 is in fluid communication with a suction tube 84. The suction tube 84 is also attached to a first connector 86 mounted on the dynamic section 64 of the spindle 56. The first connector 86 is in fluid communication with a second connector 88 on the static section 62 of the spindle 56, which is connected to a vacuum generation source (not shown). As illustrated in the drawings, the first and second connectors 86 and 88 are conventional elbow connectors. The vacuum force produced by such source improves adhesion of the lens to the suction cup 68.

Based on the aforementioned description relating to the suction supplement provided to improve the gripping of the lens, it will be appreciated that the spindle 56 includes the independently rotating dynamic section 64 for purposes of eliminating the tangling or twisting of the suction tube 84 during operation. In this regard, the position of the suction tube 84 with respect to the third connector 82 and the first connector 86 remains constant despite rotation of the carousel 24. It will further be appreciated that the vacuum applied to each suction cup 68 must be individually applied. Therefore, each first connector 86 corresponds to a separate and distinct second connector 88, and the third connector 82.

The carousel 24 and the spindle 56 are mounted on a carousel drive 90. Specifically, the carousel drive 90 includes a vertically reciprocating rotor 92. A bearing 93 is mated with the rotor 92, and attached to the carousel 24 and the spindle 56. The carousel drive 90 includes a motor for rotating the carousel 24 and the dynamic section 64 of the spindle 56 about its axis. A conventional electric motor may be utilized, but any apparatus capable of providing rotational motion may be readily substituted without departing from the scope of the present invention. The carousel drive 90 further includes a lift that causes the rotor 92 to reciprocate vertically along its axis. Thus, the carousel 24 and the spindle 56 may be raised to provide clearance for the lens prior to rotating the carousel 24 to the next workstation, and lowered to begin processing within that particular workstation. In a preferred embodiment, pneumatic or hydraulic lifts may be utilized, but need not be limited to such mechanisms. Any lifting mechanism capable of quickly raising and lowering the carousel 24 may be readily substituted.

Figure 4:
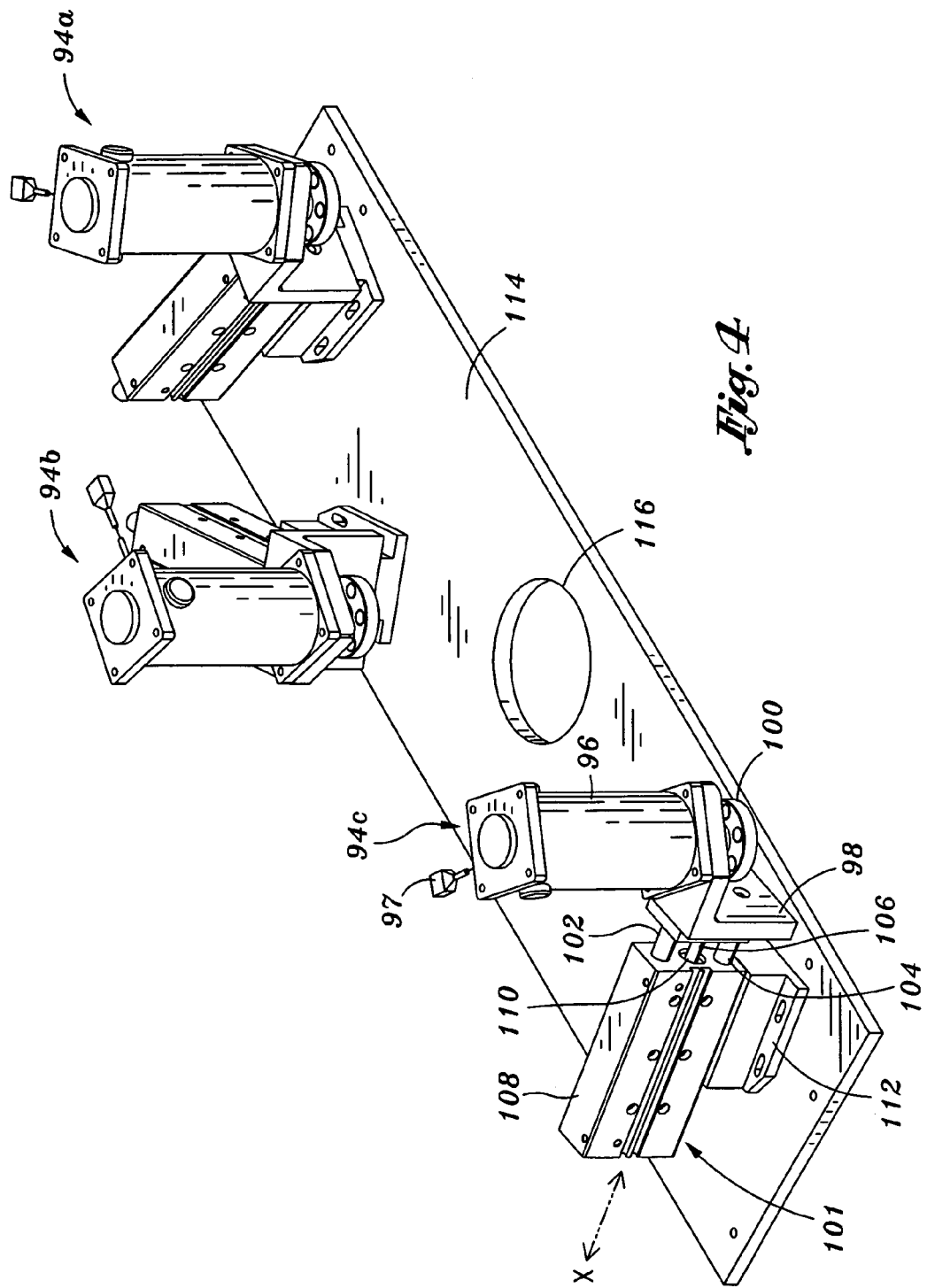
FIG. 4 is a top perspective view of a series of spin drive assemblies included in the lens coating apparatus of the present invention.

As described above, the lens coating apparatus 10 utilizes a spin coating technique in which the lens is rapidly rotated, thereby spreading the coating fluid across the surface of the lens by centrifugal force. More particularly, by rotating any first magnetic clutch 71 on the carousel 24, the drive shaft 70 attached thereto is also rotated, thus rotating the corresponding suction cup 68 and any lens secured thereto. With reference to FIG. 4, spin drive assemblies 94a, 94b, 94c are the modalities for selectively rotating the first magnetic clutches 71 on the carousel 24. In the following description, the structural and functional attributes of the spin drive assembly 94a will be described with particularity, those of ordinary skill in the art recognizing that such structural and functional attributes are also applicable to the identically configured spin drive assemblies 94b, 94c. The spin drive assembly 94a includes a spin drive 96 which is attached to a horizontal section of a corresponding L-shaped bracket 98. The rotor of the spin drive 96 is attached to a second magnet clutch 100, which is configured to be engaged to any first magnetic clutch 71 on the carousel 24. Accordingly, the disk-shaped configuration and size of each second magnetic clutch 100 is substantially identical to that of each first magnetic clutch 71. It is understood that any first magnetic clutch 71 may come into the proximity of a second magnetic clutch 100, but will never become physically attached, thus reducing the concentration of metallic dust within the interior of the lens coating apparatus 10 compared to conventional mechanically interconnected systems. Other types of non-magnetic interconnections involving physically linking the spin drive 96 to the drive shaft 70 could result in the generation of unacceptable metallic dust. The magnetic field from each second magnetic clutch 100 will attract any first magnetic clutch 71 coaxially aligned therewith, such that when the second magnetic clutch 100 is rotated, the first magnetic clutch 71 follows. In a preferred embodiment, the spin drive 96 is a brushless DC electric motor to eliminate sparks created by friction between a commutator and the rotor. In utilizing such a brushless DC motor, it will be understood that the precise power distribution within the motor needs to be electronically controlled. Therefore, a separate controller circuit must be incorporated with the spin drive 96, or separately linked via a drive controller connector 97. As explained previously, the environment within the interior of the lens coating apparatus 10 may include highly volatile chemicals that may be ignited by such sparks and by utilizing a brushless DC motor, the overall safety of the lens coating apparatus 10 is significantly improved. It will be appreciated by one of ordinary skill that the brushless DC motor offers numerous other advantages, such as precise speed control necessary for the accurate distribution on the lens surface of coatings having various viscosity, a longer operating life due to the exclusion of eroding commutator brushes, reduction of electromagnetic interference, and greater efficiency in low-load conditions. Those of ordinary skill in the art will recognize that motors other than for brushless DC motors possessing the requisite functionality are contemplated to be within the spirit and scope of the present invention.

Continuing with the description of the spin drive assembly 94a, a vertical section of the corresponding L-shaped bracket 98 is attached to a corresponding arm assembly 101 including an upper arm 102, a lower arm 104, a central piston 106, and an arm compartment 108. The upper arm 102 and the lower arm 104 are in a sliding relationship with and freely reciprocate within the cylindrical chambers defined by the arm compartment 108. The central piston 106 pneumatically reciprocates within the cylinder 110, which is likewise defined by the arm compartment 108. While referenced herein as a pneumatic device, the central pistol 106 and the cylinder 110 may be hydraulically driven as well. Thus, the spin drive 96 reciprocates along the axis X, between a retracted position and an extended position. The arm compartment 108 is attached to a mounting member 112, which is attached to a spin drive mounting surface 114.

Referring to FIGS. 1, 2, 3 and 4, the operation of the carousel 24 and the spin drive assemblies 94a, 94b, 94c as the lens is carried from workstation to workstation will be described. By way of example only and not of limitation, the lens coating apparatus 10 as illustrated in FIG. 2 is in its initial state. As particularly illustrated in FIG. 2, the workstations 14, 16, 18, 20 and 22 are arranged such that respective access ports 14a, 16a, 18a, 20a and 22a thereof are aligned with the center of a corresponding suction cup 68. In other words, the distance from the center of the hub 48 of the carousel 24 to the center of the access ports 14a, 16a, 18a, 20a, and 22a of the workstations 14, 16, 18, 20, and 22 are substantially equal.

Figure 12:
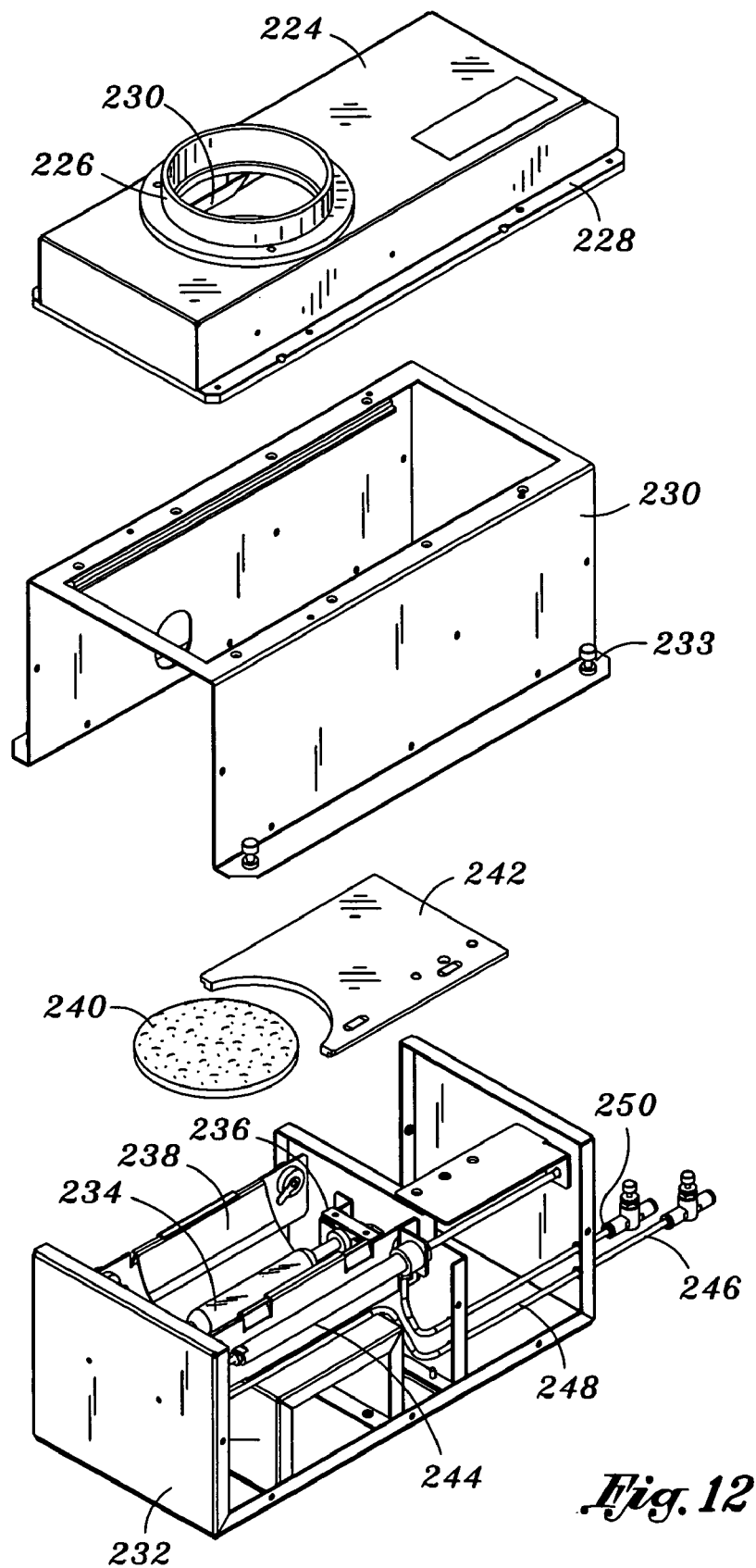
FIG. 12 is an exploded perspective view of the curing station shown in FIG. 11.

For purpose of convenience, the access ports 14a, 16a, 18a, 20a and 22a are generally referenced as such. It will be understood, however, that the access port 14a of loading station 14 corresponds to a carousel access port 134 shown in FIG. 5. Further, the access port 16a of washing station 16 corresponds to an open upper end 156 of a wash basin 154 as shown in FIG. 6, with the access port 18a of coating station 18 corresponding to the combined opening of a coating station access port 116 and a top opening 214 as shown in FIG. 9. The access port 20a of the curing station 20 corresponds to the opening defined by a flanged inlet 226 as shown in FIG. 12. With respect to the unloading station 22, it is noted that there is no structure equivalent to an access port as defined relative to the other workstations. Therefore, for illustrative purposes only, the central portion of the unloading station that is coaxially aligned with the drive shaft 70 of the carousel will be referred to as the access port 22a. It is understood that access ports 14a, 16a, 18a, 20a and 22a generally serve as an input point for the lens holder 67 to access the interior of the respective workstations 14, 16, 18, 20, and 22.

According to FIG. 1, the carousel 24 is in the lowered position wherein the suction cups 68 are enclosed within the respective workstations, and the inlet ports are covered by the splash guards 76 on each of the arms 42. The spin drive assemblies 94a, 94b, 94c are each shown in the retracted position.

Following the initial state as described above, a lens is attached to one of the suction cups 68 and retained in place thereon. Details of the process of initially attaching the lens to a suction cup 68 and the structures associated with the loading station 14 will be described below. The entire carousel 24 is lifted so that the bottom surface of the lens is capable of clearing the uppermost extremity of each of the workstations 14, 16, 18, 20, and 22. The carousel 24 is rotated, wherein the arm 42 holding the most recently attached lens is positioned over the washing station 16. The carousel 24 is again lowered, so that the lens and the suction cup 68 are enclosed within the washing station 16, and the splash guard 76 covers the inlet port 16a.

Since the washing process requires the lens to be rapidly rotated, the cylinder 110 of the spin drive assembly 94a associated with the washing station 16, activates and pulls out the central piston 106, the upper arm 102, and the lower arm 104 from the arm compartment 108 to the extended position. As this occurs, the first magnetic clutch 71 of the carousel 24 is linked to the second magnetic clutch 100 of the spin drive 96 of the spin drive assembly 94a. After reaching the extended position, the spin drive 96 is activated, and the washing process, which will be further detailed below, is initiated. Once completed, the spin drive 96 is retracted, and the carousel 24 is lifted in the manner described above. The carousel 24 is then rotated to the coating station 18.

Again, similar to the washing process, the carousel 24 is lowered such that the lens and the suction cup 68 are enclosed within the coating station 18, and the splash guard 76 covers the inlet port 18a. Since the spin drive assemblies 94a-94c are mounted directly above the coating station 18, the spin drive mounting surface 114 defines the coating station access port 116. As mentioned previously, the coating process requires that the lens be spun after depositing the coating fluid on the same. Accordingly, the spin drive assembly 94b associated with the coating station 18 activates and pulls out the central piston 106, the upper arm 102, and the lower arm 104 from the arm compartment 108. In its extended position, the first magnetic clutch 71 of the carousel 24 is linked to the second magnetic clutch 100 of the spin drive 96 of the spin drive assembly 94b, and spun. Upon completing the coating process, which will be explained in further detail below, the spin drive 96 is retraced. After retracting the spin drive 96 such that it no longer obstructs the carousel 24, the carousel 24 is lifted in the manner previously described and rotated to the curing station 20.

Upon rotating the carousel 24 such that the arm 42 holding the lens is positioned above the curing station 20, the carousel 24 is lowered so as to advance the suction cup 68 through the inlet port 20a such that the lens is enclosed within the curing station 20. Since the curing process also requires that the lens be rapidly spun, the spin drive assembly 94c associated with the curing station 20 is extended to engage the second magnetic clutch 100 of the spin drive 96 of the spin drive assembly 94c to the corresponding first magnetic clutch 71 on the carousel 24. The curing process is initiated, while the spin drive 96 is activated. The spin drive 96 is then retracted once the curing process is complete. The carousel 24 is lifted, and rotated until the lens and the suction cup 68 are positioned above the inlet port 22a of the unloading station 22. The carousel 24 is lowered, and the suction vacuum applied to the suction cup is stopped. The lens is dropped into the unloading station 22 for retrieval by an operator.

It will be appreciated by one of ordinary skill in the art that the spin drive assemblies 94a-94c are provided and utilized only where required, that is, the washing station 16, coating station 18, and curing station 20. Accordingly, a spin drive 96 need not be attached to each and every arm 42 of the carousel 24, thus decreasing degradation to the carousel drive 90. Thus, each spin drive 96 is capable of being used in conjunction more than one arm 42, which in turn allows the number of spin drives 96 included in the coating apparatus 10 to be well below the number of arms 42 included in the carousel 24. The capacity to use each of the spin drives 96 with each of the arms 42 of the carousel 24 is also made possible by the ability to achieve a requisite of level of clearance between the spin drive assemblies 94a-94c and the carousel 24 as needed to accommodate the vertical movement of the carousel 24 along the axis of its hub 48. In this regard, as indicated above, the spin drive assemblies 94a-94c may be translated back and forth along a horizontal axis (and thus out of the way of the carousel 24) by the actuation of the corresponding arm assemblies 101. It will further be appreciated that more than one lens can be concurrently processed, with the lenses attached to each of the arms 42 being processed by a different workstation in the sequence. Each workstation processes the lens for approximately twenty-three (23) to twenty-four (24) seconds, with the exception of the quicker unloading and loading stations. Thus, approximately two to three lenses may be processed per minute.

Figure 5:
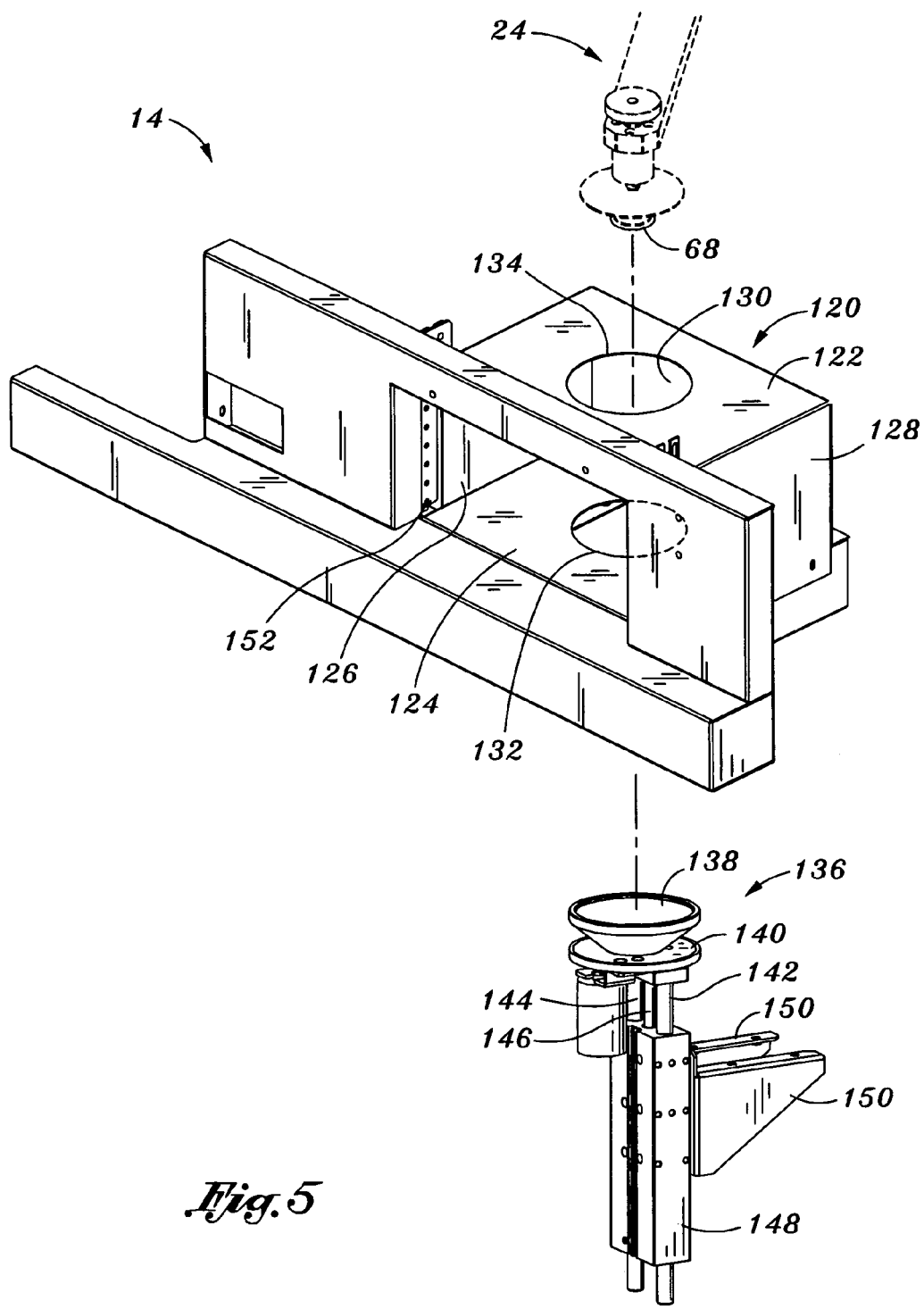
FIG. 5 is an exploded perspective view of a loading station of the lens coating apparatus of the present invention, including a lens lift and the carousel interfacing with the loading station.

Further details with respect to the individual workstations will now be described. Referring now to FIG. 5, the loading station 14 is defined by a front panel 118, and a loading station enclosure 120. The front panel 118 defines a front opening 119 to provide access for the operator to load the lenses. The enclosure 120 is defined by a top wall 122, a bottom wall 124, a left sidewall 126, a right sidewall 128, and a back wall 130. The top wall 122 is parallel to and opposite the bottom wall 124, both of which are perpendicular to the left and right sidewalls 126 and 128. The bottom wall 124 defines a lens lift access port 132, and the top wall 122 defines the carousel access port 134. Attached under the bottom wall 124 is a lens lift 136, which includes a lens cup 138 for holding the lens. The lens lift 136 is positioned so that the lens cup 138 can pass through the lens lift access port 132. It is understood that the diameter of the lens lift access port 132 is sufficient to permit the lens cup 138 to pass through, while preventing a substantial portion of the space under the bottom wall 124 from becoming exposed. The base 140 is attached to a right lift arm 142 and a left lift arm 144, as well as to a reciprocating piston 146. The right and left lift arms 142, 144 are in a sliding relationship with a housing 148. The piston 146 interfaces with a cylinder (not shown) disposed within the housing 148. The piston/cylinder combination may be hydraulically or pneumatically actuated. The housing 148 is attached to a lift mounting bracket 150, which is also attached to the bottom wall 124.

When the lens is placed on the lens cup 138, a curtain 152 disposed on the peripheral edges of the front opening 119 extends, closing off the enclosure 120. The lens lift 136 then elevates the lens to the suction cup 68 and is secured thereon. More particularly, the vacuum is applied to the corresponding suction cup 68, with the convex surface of the lens adhering thereto. It is contemplated that the lens cup 138 of the lens lift 136 may be adapted to effectively center the lens at its weight center subsequent to the placement of the lens thereon. Such centering may be accomplished, for example, through the use of vibration.

Referring now to FIGS. 6, 7 and 8, details of the washing station 16 will now be discussed. With particular reference to FIG. 6, the washing station 16 includes a hollow, cylindrical wash basin 154. The wash basin 154 defines the open upper end 156 and a top rim 158. The top rim 158 serves to partially close off the wash basin 154 from the exterior thereof, and is sized to permit the insertion of the splash guard 76 while preventing fluids from escaping during operation. The wash basin 154 is attached to a planar mounting base 155, and is elevated with a left bracket 168 on the left side of the planar mounting base 155 and with a right bracket 170 on the right side of the planar mounting base 155. As shown in FIGS. 6 and 8, the left and right brackets 168 and 170 are generally L-shaped, and the horizontal portions thereof include mounting fastener receiving holes 172.

In order to wash the lens, a jet of high pressure de-ionized water and cleaning fluid are sprayed on the lens. In a preferred embodiment, the pressure of the jet will be approximately 2500 pounds per square inch (psi). In this regard, there is a water supply pipe 160 that extends through the lower section of the wash basin 154, and as illustrated in FIG. 8, includes a water jet nozzle 162. The cleaning fluid is supplied by an inlet pipe 164 which enters through the side of the wash basin 154 and is coupled to the water jet nozzle 162. To ensure a consistent stream of the cleaning fluid, a reservoir 166 is in fluid communication with the inlet pipe 164.

The water supply pipe 160 is rotatably mounted on the pipe mounting section 174 of the left and right brackets 168 and 170. The water supply pipe 160 is coupled to a first wheel 176, which is in turn coupled to a motor wheel 178 by a belt 180. It will be recognized, however, that any suitable drive transfer mechanism may be utilized, such as a chain and sprocket, interlocking gears, and the like. Thus, a motor 182, which is coupled to the motor wheel 178, is operative to rotate the water supply pipe 160 within the limits of a rotation constraining member 186. The rotation constraining member 186 may be operative to transmit a signal to the motor 182 to reverse the rotational direction, or to the data processing device controlling the motor 182. The water jet nozzle 162 and the attached inlet pipe 164 thereby trace a radial path on the lens as the water supply pipe 164 is rotated in the left and right brackets 168 and 170. Concurrently, the lens may be rapidly rotated within the wash basin 154 according to the methods and devices hereinbefore described.

After thoroughly cleansing the surface of the lens with fluids and prior to applying the coating, it is necessary to dry the lens. The primary mechanism by which this is accomplished is the aforementioned spinning of the lens. For this purpose, a person of ordinary skill will recognize that the lens must be spun faster than for spreading the lens coating. Additionally, the wash basin 154 includes a vacuum port 188 for withdrawing vaporized fluid particles from the interior thereof. A tube (not shown) may be attached to the vacuum port 188 and connected to a vacuum generation source. The bottom of the wash basin 154 is funnel shaped so as to channel the remaining fluid therein to a drain 190. In a preferred embodiment, the drain 190 is attached to a drain tube 192 that removes the fluid from the lens coating apparatus 10.

Turning now to FIGS. 9 and 10, the details relating to the coating station 18 will now be discussed. The coating station 18 is located underneath the spin drive mounting surface 114, and includes a first coating tank assembly 194 and a second coating tank assembly 196. Both the first and second coating assemblies 194 and 196 may be shifted in position such that the coating station access port 116 provides access for the carousel 24 to be lowered into either one of the first or second coating tank assemblies 194, 196. More particularly, the first and second coating tank assemblies 194 and 196 are attached to a sliding plate 198, which is in a sliding relationship with a frame mounting plate 200. The sliding plate 198 includes a set of wheels 202 rotatably mounted thereon. The wheels 202 travel on a set of tracks 204. The motive force to shift the position of the sliding plate 198 relative to the frame mounting plate 200 is provided by a piston 206 and a cylinder 208, which may be actuated either hydraulically or pneumatically. Specifically, the piston 206 is attached to the sliding plate 198, while the cylinder 208 is attached to the frame mounting plate 200. When the piston 206 is fully extended from the cylinder 208, the first coating tank assembly 194 will be open through the coating station access port 116, and when the piston 206 is fully retracted within the cylinder 208, the second coating tank assembly 196 will be open through the coating station access port 116. Thus, the operator of the lens apparatus 10 may select between two different coating fluids. Further, the selection may be unique from one lens to the next.

Except for the positioning on the sliding plate 198, the first coating tank assembly 194 and the second coating assembly tank 196 are identical. For sake of simplicity, only relevant features on the first coating tank assembly 194 will be described. It will be understood, however, that a feature on the first coating tank assembly 194 will correspond to an identical feature on the second coating tank assembly 196. With reference now to FIG. 9, the first coating tank assembly 194 includes a hollow cylindrical coating basin 210, with a rim 212 partially covering the top opening 214. The coating fluid is held in a reservoir 216, and is in fluid communication with the coating basin 210. A cylinder 218 links the coating basin 210 to a diaphragm pump 220, which is operative to deposit coating fluid on the lens when it is inserted into the coating basin 210. The cylinder 218 is bound by a pair of brackets 222 at both the upper end and the lower end. As illustrated, the brackets 222 mount the first coating tank assembly 194 to the sliding plate 198.

Turning now to FIGS. 11 and 12, further details concerning the curing station 20 will now be explained. As shown in FIG. 11, the carousel 24 is lowered such that the corresponding suction cup 68 holding the lens is placed within the curing station 20. An ultraviolet light within dries and cures the coating applied to the lens. Now referring to FIG. 12, the curing station includes a top cover 224 with the flanged inlet 226 attached thereto. The top cover 224 defines an opening which is contiguous with the opening defined by the attached flanged inlet 226. Fixed to the bottom of the top cover 224 is a middle plate 228, which also defines an opening coaxial with the opening defined by the top cover 224 and the inlet 226. On both sides of the opening in the middle plate 228 is an opposed pair of deflectors 230. The top cover 224 and the middle plate 228 are attached to an enclosure 230, and to the frame 12 with frame mounting fasteners 233. Inside the enclosure 230 is a lower frame 232, which includes an ultraviolet lamp 234 attached to a pair of opposed lamp holders 236. In order to fully utilize the entire radiating surface of the ultraviolet lamp 234, disposed underneath is a focusing reflector element 238. By directing the ultraviolet emissions to the lens, the lens is dried and cured.

It is understood that the ultraviolet lamp 234 generates excess heat during operation, and is undesirable due to the risk of damage to the lens. The heat applied to the lens is reduced primarily by isolating the same in a compartment defined by the top cover 224 and the middle plate 228. Further, the emissions of the ultraviolet lamp 234 are attenuated by use of a filter 240 placed under the opening defined by the middle plate 228. The filter 240 is attached to a filter support 242, and also serves a secondary function of preventing any excess coating fluid remaining on the lens to drip on to the ultraviolet lamp 234. The temperature in the general area defined by the lower frame 232 is further controlled by a cooling element 244, which operates by convection. A coolant input 246 supplies a gaseous or aqueous coolant for passage through a coolant tube 248 to the cooling element 244. The heated coolant is returned through the coolant output 250. As will be recognized by one of ordinary skill in the art, the faster the coolant is passed through the cooling element 244, the greater the temperature reduction effects.

With reference now to FIG. 13, the unloading station 22 includes a chute surface 252, and a pair of opposed chute walls 254 extending perpendicularly to the chute surface 252 at its periphery. Additionally, a pair of angled mounting brackets 256 attaches the chute surface 252 and the chute walls 254 to the frame 12. Referring back to FIG. 1, a portion of the chute surface 252 and the chute walls 254 extends out from the frame so the completed lens placed thereon may be retrieved by the operator. It will be appreciated that the chute surface 252 and the chute walls 254 are constructed of a non-abrasive material so that after the lens is released from the suction cup, the lens does not become scratched as it slides to the bottom of the unloading station 22.

Those of ordinary skill in the art will recognize that the loading of lenses from trays into the loading station 14 of the lens coating apparatus 10 and the unloading of lenses from the unloading station 22 into trays may be automated to increase throughput. Further, it is contemplated that the lenses may be coated through the use of the lens coating apparatus 10 while "on the block" (i.e., a holding block attached to the convex side of the lens prior to surfacing the lens by milling or lathing the prescription) using suction or a chuck mechanism.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

What is claimed is:

1. An apparatus for manufacturing a lens, comprising:
   a frame;
   a plurality of workstations disposed on the frame, at least one workstation applying a coating to the lens;
   a rotatable carousel disposed on the frame, the carousel having a hub and a plurality of arms, each of the arms defining a proximal end attached to the hub and an opposed distal end;
   a drive shaft mounted in close proximity to the distal end of each of the arms;
   a lens holder attached to each of the drive shafts;
   a first magnetic clutch attached to each of the drive shafts; and
   at least one spin drive assembly attached to the frame and including:
      a second magnetic clutch; and
      a spin drive which is operatively connected to the second magnetic clutch to selectively impart a rotational motion thereto;
   the carousel being operative to selectively align any one of the first magnetic clutches with the second magnetic clutch for allowing the second magnetic clutch to magnetically engage the first magnetic clutch aligned therewith and transfer rotational motion generated by the spin drive to the drive shaft and the lens holder attached thereto.

2. The apparatus of claim 1, wherein multiple spin drive assemblies are attached to the frame, the second magnetic clutch of each of the spin drive assemblies being operative to engage the first magnetic clutch of any one of the arms.

3. The apparatus of claim 2, wherein the number of arms included on the carousel exceeds the number of spin drives.

4. The apparatus of claim 1, wherein the hub of the carousel defines an axis and is configured to reciprocate along the axis between an elevated position and a lowered position relative to the frame.

5. The apparatus of claim 4, wherein the spin drive assembly includes an arm assembly which is operatively coupled to the spin drive and adapted to selectively actuate the spin drive between an extended position and a retracted relative to the carousel.

6. The apparatus of claim 5, wherein the spin drive assembly is oriented relative to the carousel such that the second magnetic clutch is placeable into coaxial alignment with one of the first magnetic clutches when the arm assembly is in the extended position and the carousel is in the lowered position.

7. The apparatus of claim 1, wherein each of the workstations defines an access port which is sized and configured to allow for the passage of the lens and the lens holder therethrough.

8. The apparatus of claim 7, further comprising an annular splash guard attached in close proximity to the distal end of each of the arms and coaxially aligned with the drive shaft, the splash guard being configured to substantially cover the access port when the corresponding lens holder is advanced therethough.

9. The apparatus of claim 1, wherein the lens holder includes a suction cup having a vacuum conduit for retaining the lens by suction imparted through the vacuum conduit.

10. The apparatus of claim 1, further comprising a spindle having a rotationally static section and a rotationally dynamic section, the rotationally static section being movably mounted to the frame and the rotationally dynamic section being fixed to the hub of the carousel.

11. The apparatus of claim 1, wherein the spin drive is a brushless direct current motor.

12. An apparatus for manufacturing a lens, the apparatus comprising:
   a frame;
   a plurality of workstations disposed on the frame, at least one workstation applying a coating to the lens;
   a carousel drive attached to the frame;
   a carousel including a hub attached to the carousel drive and a plurality of arms extending from the hub, each of the arms defining a proximal end attached to the hub and an opposed distal end, the carousel drive being operative to selectively rotate the carousel and to facilitate the selective reciprocal movement of the carousel along an axis defined by the hub thereof between an elevated position and a lowered position relative to the frame;
   a drive shaft mounted in close proximity to the distal end of each of the arms;
   a lens holder attached to each of the drive shafts;
   a first magnetic clutch attached to each of the drive shafts; and
   at least one spin drive assembly attached to the frame and including:
      a second magnetic clutch;
      a spin drive which is operatively connected to the second magnetic clutch to selectively impart a rotational motion thereto; and
      an arm assembly which is operatively coupled to the spin drive and adapted to selectively actuate the spin drive between an extended position and a retracted relative to the carousel;
   wherein the spin drive assembly is oriented relative to the carousel such that the second magnetic clutch is placeable into coaxial alignment with one of the first magnetic clutches when the arm assembly is in the extended position and the carousel is in the lowered position, the coaxial alignment between any one of the first magnetic clutches and the second magnetic clutch allowing the second magnetic clutch to magnetically engage the first magnetic clutch aligned therewith and transfer rotational motion generated by the spin drive to the drive shaft and the lens holder attached thereto.

13. The apparatus of claim 12, wherein multiple spin drive assemblies are attached to the frame, the second magnetic clutch of each of the spin drive assemblies being operative to engage the first magnetic clutch of any one of the arms.

14. The apparatus of claim 13, wherein the number of arms included on the carousel exceeds the number of spin drives.

15. The apparatus of claim 12, wherein each of the workstations defines an access port which is sized and configured to allow for the passage of the lens and the lens holder therethrough.

16. The apparatus of claim 15, further comprising an annular splash guard attached in close proximity to the distal end of each of the arms and coaxially aligned with the drive shaft, the splash guard being configured to substantially cover the access port when the corresponding lens holder is advanced therethough.

17. The apparatus of claim 12, wherein the lens holder includes a suction cup having a vacuum conduit for retaining the lens by suction imparted through the vacuum conduit.

18. The apparatus of claim 12, further comprising a spindle having a rotationally static section and a rotationally dynamic section, the rotationally static section being movably mounted to the frame and the rotationally dynamic section being fixed to the hub of the carousel.

19. The apparatus of claim 12, wherein the spin drive is a brushless direct current motor.

* * * * *